United States Patent Office 3,246,697
Patented Apr. 19, 1966

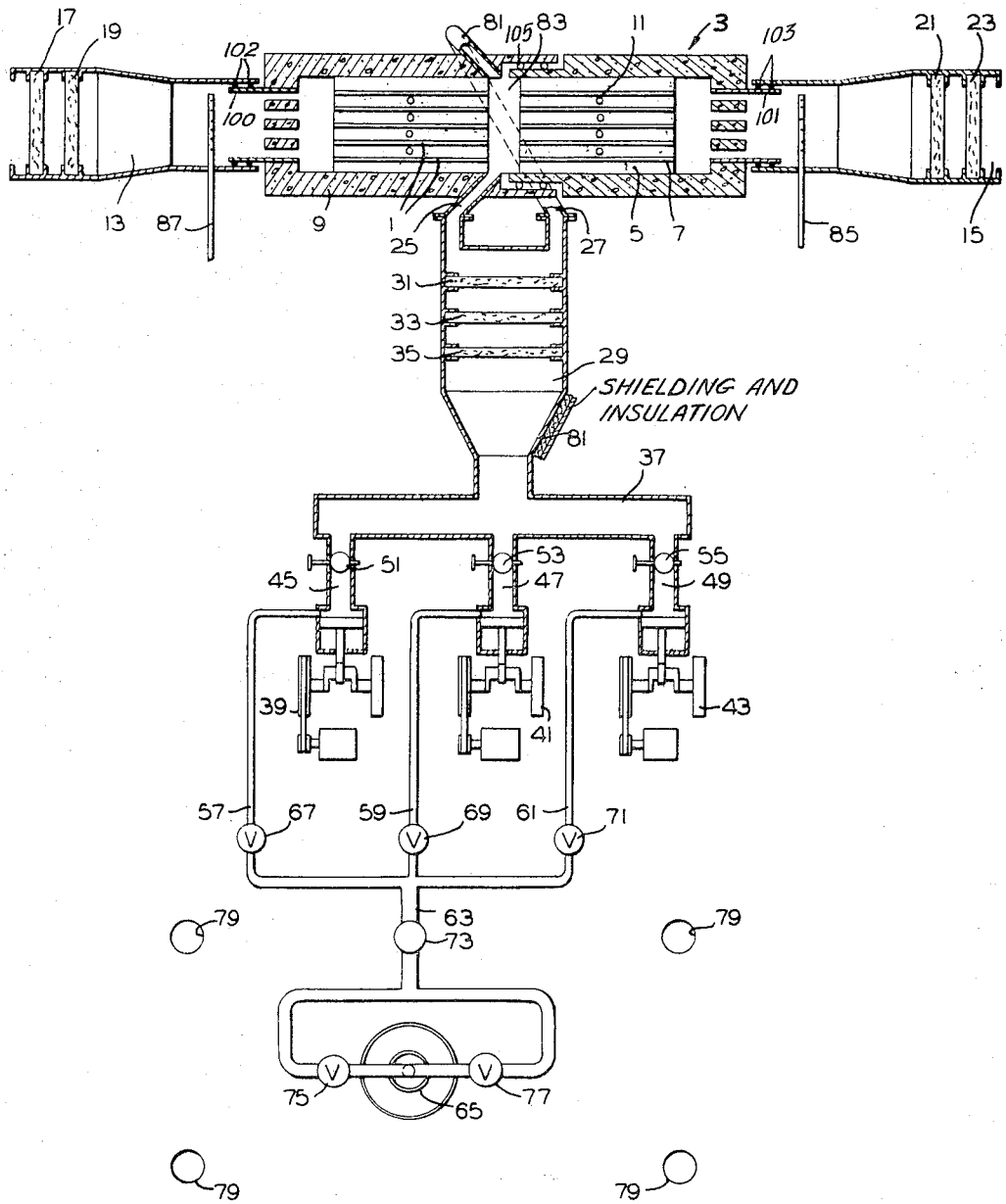

3,246,697
APPARATUS INCLUDING A NUCLEAR REACTOR
FOR HEATING INJECTION GASES
Manley L. Natland, Rolling Hills, Calif., assignor to Richfield Oil Corporation, Los Angeles, Calif., a corporation of Delaware
Original application Sept. 8, 1958, Ser. No. 759,534.
Divided and this application Sept. 17, 1963, Ser. No. 309,464
8 Claims. (Cl. 166—57)

The present application is a division of my parent application Serial No. 759,534, filed September 8, 1958, and now abandoned.

The present invention relates to apparatus useful for enhancing the recoveries of hydrocarboniferous materials from subterranean formations (such as tar sands, oil sands, oil shales, coal), the apparatus involving a gas cooled nuclear reactor so as to heat the gas to a high temperature and pump means receiving the gas from the reactor for pressuring the gases heated in this manner into the subterranean formation. In a more specific aspect the present invention further envisions apparatus of this character including means for the introduction of a gamma emitting material or other materials into the subterranean formation along with high temperature-high pressure gas in order to further assist in recoveries.

In accordance with the present invention I have provided a new and improved apparatus for stripping an oil-bearing formation of its petroleum content, preferably after conventional flowing and pumping methods have ceased to be economical or by recovering the petroleum fluids from a formation wherein the petroleum is too heavy and viscous for recoveries in the usual manner; for instance, from unconsolidated oil sands such as those found in the Athabasca river region of Canada and containing full or substantial distillation range oils of low gravity, say about 4 to 15° API. Briefly, the present invention can be said to involve a gas cooled neutronic reaction means interconnected in such a manner that the gas upon passing through the reactor is in heat exchange relationship with the reactive elements of the reactor and thereby serves to remove the heat of the fission reaction while at the same time increasing the temperature of the cooling gases. The gases heated in this manner will generally have a temperature sufficient to give a formation temperature of at least about 100° C. and preferably they will have a temperature in the range of about 200° F. to 600° F. The heated gases are withdrawn from the reactor and passed under pressure by means of a pump down a bore hole traversing the oil-bearing formation and thence outwardly into the formation. The hot gases passing into the formation serve to raise the temperature of the petroleum contained in the formation thereby reducing its viscosity and rendering it more flowable and easily recovered. If desired, a series of output bore holes can be provided surrounding the site of gas injection so that the high pressure maintained on the hot gases will serve to drive the petroleum outwardly and into the output wells from whence it can be recovered.

The present invention further provides for the provision of means for injection of an additional material into the formation which serves to crack the petroleum and thereby reduce its viscosity. Thus, I can introduce into the reactor along with the cooling gases or separately if desired, a material which upon bombardment in the reactor will become radioactive and in the subsequent process of decay, emit gamma radiation. This material can be any one of a number of substances if desired. I, however, prefer to utilize water as the material to be irradiated in the reactor, this preference being due to the relatively short half life of the radionucleides produced and to the gamma ray emitting properties of the radionucleide. For instance, water under radiation will yield $N^{16}$ having a life of about 7.35 sec. and a gamma ray activity of about 6.2 mev. and possibly some $O^{19}$ having a half life of about 29.4 sec. and a gamma ray activity of about 1.6 (70%) mev. A material having a relatively short half life is advantageous because of the desirability of producing petroleum which does not itself carry over a high degree of radioactivity and thus present additional problems in above-surface handling or storage. This latter modification has particular utility in formations such as the Athabasca oil sands wherein the viscosity of the petroleum is extremely high and its molecular structure is such that only large relatively immobile molecules are present.

In order to more fully illustrate the present invention reference is made to the following drawing wherein is shown in schematic form a plan view of one modification of a nuclear reactor and pumping system which can be used in the present method.

The reactor can be any of those known to the art which employ a circulation of gas as the cooling medium. For instance, it can be a heterogeneous natural uranium, graphite moderated reactor such as described in U.S. Patent Nos. 2,836,554 or 2,708,656 to Fermi or as described in "Selected Reference Material, United States Atomic Energy Program—Research Reactors," U.S. Government Printing Office 1955, pp. 384 to 442, or it can be any one of the numerous enriched uranium reactors moderated by other materials such as water or heavy water. In general, I prefer a reactor of the type described in the above-noted Fermi et al., U.S. 2,836,554 patent. Reactors of this type can be operated at power levels of about 30,000 to 50,000 kilowatts to produce exit cooling gases having temperatures in the range of about 100 to 600 degrees C. and which are sufficiently high for purposes of the present invention.

Referring to the drawing, it can be seen that the reactor can comprise a reactive core 3 constructed of graphite blocks 5 interlocked together to provide a moderating shield and having channels 7 therethrough to accommodate aluminum finned tubes loaded with the reactive uranium slugs. The reactive core is surrounded by a concrete shield 9 the thickness and density of which can be any found necessary to contain the radioactivity produced by the fission reaction. For the specific details of construction, geometry, critical mass of uranium, etc. of the reactive core, reference is made to the above-noted patents and publication incorporated herein by reference. In reactors of this type the finned tubes loaded with uranium are constructed so that passageways are provided for the ingress and egress of air or other cooling gaseous medium therethrough. The rate of fission and hence the temperature produced by the reactor can be controlled by the withdrawal or insertion of boron control rods as shown at 11. Cooling air is drawn into and through the reactor at either end by means of ducts 13 and 15 having filters 17, 19, 21 and 23 therein for removing impurities and dust particles from the air which may tend to poison the nuclear fission reaction. Heated air is withdrawn from the reactor by means of outlets 25 and 27 after which it passes through filtering unit 29 having a series of filters 31, 33 and 35 therein. The filtered hot air then passes to manifold 37 for distribution to compression pumps 39, 41 and 43 via lines 45, 47 and 49 having regulatory valves 51, 53 and 55 therein. The heated air passes under pressure through lines 57, 59 and 61 into line 63 and thence into the input bore hole 65. Valves 67, 69, 71, 73, 75 and 77 can be provided in lines 57, 59, 61 and 63 in order to control the rate of gas flow into the bore hole 65. Input bore hole 65 can have arranged therearound a series of output bore holes 79 in any pattern desired. I prefer, however, that the output bore holes 79 be arranged in the conventional five-spot pattern as shown. Shielding and insulation 81 can be provided around all lines conducting the heated gases from the reactor to the bore hole 65 in order to prevent undue losses of heat to the atmosphere and contamination of the surrounding equipment and personnel.

The operation of the above reactor to accomplish the present method can be described as follows. The reactor can be set to the proper power output, for instance 20,000 kilowatts by conventional adjustments of the control rods 11 and cooling air can be drawn in through the filters in ducts 13 and 15 at a rate sufficient to cool the reactive elements at least below their melting point. The air passes through the channels around the fissionable elements, carrying away the heat generated by the reaction. The air can be drawn through the reactor at a rate of for instance, about one million pounds per hour and at this rate will have an exit temperature approximating about 200 degrees C. This full complement of air of course need not be passed into the formation but rather a part thereof can be taken off as a sidestream and recirculated through the reactor after cooling. The air thus heated is drawn into a central chamber 83 of the reactor from which it passes via duct 29 through the outlet filters 31, 33 and 35 to remove any irradiated particles. The clean hot air next passes to the manifold 37 and then to the battery of pumps 39, 41 and 43 through lines 45, 47 and 49. These pumps serve to provide the vacuum power necessary to draw the air into and through the reactor as well as provide the pressure to force the heated air into the bore hole 65 in communication with the subsurface oil-bearing formation. The pumps can be of any type desired and, as here shown, are of the reciprocating piston type, the piston being driven by means of an offset crank, flywheel and electric or gas motor. The pumps as noted above are operated at a speed sufficient to draw the desired amount of air through the reactor while at the same time maintaining the desired pressure on the gases passing into the formation. This pressure of course must be at least sufficient to overcome normal well bore pressure but not however so great that the overburden will be disrupted or displaced.

The heated gases passing into the formation serve to increase the temperature of the hydrocarboniferous fluids contained therein and may result in a volatilization of a part of the fluid as well as reduce the viscosity of the remainder. In some areas, where the present method will be most effective, e.g. unconsolidated oil sands such as found in the Athabasca region of Canada, a complete line of petroleum products may be recovered from the extremely heavy, viscous crude. Thus crudes such as this can have an API gravity of from about 4 to 10 degrees depending upon the degree of its exposure to oxidation. Subjection of such crudes for moderate periods of time will convert it to much lighter more fluid crudes with API gravities of about 16 to 22 degrees without the formation of carbon and without degrading the quality of the asphaltic fraction. Such crudes digested by the heating can produce gasoline in 25 to 30 percent yields with no cracking being necessary, as well as petroleum products in all boiling ranges. Digestion in the present manner need not in itself be cracking since no fixed carbon, virtually no free gases and no products formed heavier than those originally in the crude need be formed.

The subsurface hydrocarboniferous fluid can be withdrawn by conventional methods up the input bore hole or if desired, the fluid can be withdrawn through output bore holes 79 surrounding the input bore hole, with the pressurized heated air serving to establish a hot air drive in the formation and forcing the heated petroleum outwardly into the output bore holes.

The heating effect of the hot gases may not, in some cases, be adequate to render the subsurface petroleum sufficient fluid to be recovered by normal flowing and pumping procedures. Particularly if this be the case, but in any event, the present invention further envisions supplying a gamma emitting material in the formation in order to bring about cracking of the heavy viscous petroleum, thereby increasing its fluidity by providing products of decreased molecular weight. In order to accomplish this result I have provided lines 87 and 85 interposed in the intake ducts 15 and 13 of the reactor so that a material to be irradiated can be passed through the reactor along with the cooling gases. For instance, water can be sprayed into the ducts and in its passage through the channels between the fissionable elements will become irradiated providing radionucleide $N^{16}$ and perhaps some $O^{19}$ each of which emit gamma rays in certain intensities. The radionucleides are passed down the bore hole and into the formation along with the hot gases wherein the gamma rays admitted therefrom serve to crack the heavy viscous petroleum into lighter and less viscous products. Due to the short half life of these radionucleides the petroleum product recovered will not be substantially contaminated and the contact with the gamma radiation will not be of so prolonged an extent that undesirable polymerization, condensation, etc. of the petroleum molecules will occur.

Although in the above description I have only described the passage of air as the cooling medium through the reactor it is to be realized that other inert or heat stable gases may be used if desired. For instance, nitrogen, carbon dioxide, helium, argon, and hydrocarbons such as methane and ethane can be utilized. Furthermore, the gamma emitting material can, of course, be other than water if desired, so long as the radionucleides formed have a sufficiently short half life to substantially eliminate permanent contamination of the recovered petroleum product and so long as the gamma ray intensity is not such that polymerization, condensation, etc. rather than cracking is effected in the subsurface formation.

The recovery can be further enhanced if desired by injecting into the formation along with the hot gases heated as described above small but effective amount of sulfur and/or oxygen preferably in their pure form rather than as compounds such as $SO_2$ and $H_2S$, although the latter could be used if desired. The addition of small amounts of these materials along with the high temperature produced by the hot gases will even further alter the chemical composition of the crude petroleum and hence render the petroleum more easily recovered.

Additionally the apparatus can be operated in such a manner as to bring about what can be called in situ cracking of the crude petroleum. Thus, the reactor can be operated at such a power output that the gases will impart to the formation temperature upward of about 600 to 750 degrees F. or higher. At these temperatures nearly all asphaltic oils will start cracking. By maintaining the injection at a high rate a slow moving heat wave can be established through the formation, with the highly volatile cracked fractions moving outward with the hot gas wave and recoverable as through the output bore holes.

It is noted that the valves 51, 53 and 55 may be check valves. It is noted also that each of the pumps 39, 41 and 43 has its inlet connected to the inlet manifolds 37 and its pressure outlet connected to a conduit extending into the formations, i.e. into the inlet bore hole 65. The reactor and pump means are all located above the surface. By connecting the suction side of the pump means to the outlet of the reactor important advantages are achieved in that air in the inlets 13 and 15 and in the reactor is substantially at atmospheric pressure or below atmospheric pressure whereby these elements need not be pressurized. Indeed this arrangement is particularly desirable since it allows portability. In this latter respect it is noted that the inlet ducts 13 and 15 are connected respectively to the reactor inlet connections 100 and 101 with such ducts being sealingly and releasably connected to the reactor by O rings 102 and 103 which are between the ducts and the reactor inlet connections. It is noted also that the reactor actually comprises two sections for portability with a left hand section and a right hand section being sealingly and releasably interconnected using O rings 105 between telescoping portions of the reactor sections. This construction also provides for portability in oil fields where needed.

Further it is noted that the material inlet conduits 87 and 85 extend into the inlet ducts 13 and 15 at a region of reduced cross section and thus are located essentially within a Venturi section where there is a subatmospheric pressure to facilitate and regulate the amount of materials injected into the reactor from the conduits 87 and 85. With this arrangement there is essentially a regulated amount of material introduced into the reactor dependent upon the philosophy, i.e. quantity of air entering the inlet ducts 13 and 15.

The spacing of the input bore hole 65 from an output bore hole is dependent to a large extent on the particular formation and for example in general with a pressure applied to the input bore hole of 1000 pounds per square inch the spacing between the input bore hole and the output bore hole may be 225 feet. In general the pressure is sufficient to lift the formation overburden between the input and output bore holes for the required permeability.

Each output bore hole 79 is preferably cased and connected to the suction side of conventional pumping means to facilitate the flow of fluids from the output bore holes.

I claim:

1. Apparatus for the recovery of subterranean hydrocarboniferous fluids from formations comprising the combination of a gas cooled neutronic reactor, means forming an inlet for the flow of gas to the reactor for cooling the same, means forming an outlet for the flow of said gas from and heated by said reactor, gas compression pump means having its suction side connected to said outlet for drawing gas through said reactor at substantially atmospheric pressure, a gas line extending into said formations and being connected to the pressure outlet side of said pump means.

2. Apparatus as set forth in claim 1 including gas filter means in said inlet through which said gas flows.

3. Apparatus as set forth in claim 1 in which said reactor and pump means are located above the surface of the earth.

4. Apparatus as set forth in claim 1 including at least one fluid recovery line spaced from and extending into said formations.

5. Apparatus as set forth in claim 1 including conduit means extending into said inlet for injecting materials into the gas flow.

6. Apparatus as set forth in claim 5 in which said conduit means extends into a reduced cross sectional area of said inlet.

7. Apparatus as set forth in claim 1 in which said reactor comprises two sections each having a separate gas inlet connection and a common gas outlet connection, said means forming an inlet comprising a tubular duct for each of said sections, and means sealingly and releasably joining each of said connections to a corresponding one of said ducts, said means forming an outlet being connected to said common gas outlet connection.

8. Apparatus as set forth in claim 7 including means sealingly and releasably connecting said reactor sections.

References Cited by the Examiner

UNITED STATES PATENTS

| | | | |
|---|---|---|---|
| 1,263,618 | 4/1918 | Squires | 166—11 X |
| 1,494,735 | 5/1924 | Cooper | 166—11 X |
| 2,497,868 | 2/1950 | Dalin | 166—11 |
| 2,827,429 | 3/1958 | Binner et al. | 176—59 |
| 2,831,807 | 4/1958 | McGarry | 176—59 |
| 2,928,781 | 3/1960 | Wigner et al. | 176—59 |

CHARLES E. O'CONNELL, *Primary Examiner.*

BENJAMIN HERSH, *Examiner.*